United States Patent [19]

Shalkevich

[11] Patent Number: 5,743,285

[45] Date of Patent: Apr. 28, 1998

[54] GAS CYLINDER THERMAL RELIEF VALVE

[75] Inventor: Mark Shalkevich, North Hollywood, Calif.

[73] Assignee: Circle Seal Controls, Inc., Corona, Calif.

[21] Appl. No.: 633,926

[22] Filed: Apr. 17, 1996

[51] Int. Cl.$^6$ ................................................. F16L 37/28
[52] U.S. Cl. ........................................ 137/74; 137/79
[58] Field of Search ............................... 132/72, 74, 79

[56] References Cited

U.S. PATENT DOCUMENTS

| | | | |
|---|---|---|---|
| 1,924,417 | 8/1933 | Ryan | 137/161 |
| 1,925,007 | 8/1933 | Rowley | 169/42 |
| 4,164,953 | 8/1979 | Naab et al. | 137/72 |
| 4,488,566 | 12/1984 | Hicks | 137/74 |
| 4,498,491 | 2/1985 | Chamberland et al. | 137/72 |
| 4,553,589 | 11/1985 | Jennings et al. | 166/53 |
| 4,932,431 | 6/1990 | Silagy | 137/74 |
| 5,109,881 | 5/1992 | Baker | 137/72 |
| 5,161,738 | 11/1992 | Wass | 236/92 |
| 5,197,671 | 3/1993 | Wass et al. | 236/92 |
| 5,213,128 | 5/1993 | Baird | 137/73 |
| 5,562,118 | 10/1996 | Cross | 137/79 |
| 5,632,297 | 5/1997 | Sciullo et al. | 137/72 |
| 5,647,390 | 7/1997 | Wass | 137/79 |

*Primary Examiner*—Marguerite McMahon
*Attorney, Agent, or Firm*—Fish & Richardson P.C.

[57] ABSTRACT

A thermal relief valve for a gas cylinder has a body with an inner wall defining a passageway for flow of fluid between inlet and outlet. A piston within the bore moves between a first position arresting flow from inlet to outlet, and a second position permitting flow from inlet to outlet. A restricting assembly for arresting movement of the piston towards the second position includes a thermal sensitive element of suitable eutectic material at the bore inner wall, with protrusions defining a first camming surface, and two or more restricting elements defining a second camming surface positioned to engage the first camming surface. The thermal sensitive element, at lower temperatures, maintains the second camming surface for engagement with the first camming surface, thereby to arrest movement of the piston, and, at higher temperatures, permits movement of the restricting elements into a position with the second camming surface spaced from engagement with the first camming surface, thereby to permit movement of the piston to release fluid.

4 Claims, 2 Drawing Sheets

5,743,285

GAS CYLINDER THERMAL RELIEF VALVE

BACKGROUND OF THE INVENTION

The invention relates to thermal relief valves for gas cylinders.

Safety regulations for storage and handling of cylinders of flammable gas under pressure often require use of a valve that automatically releases the cylinder contents when temperature conditions exceed a predetermined level, e.g. in the case of a fire, to allow escape of the gas before the cylinder ruptures. Typical requirements are for a non-reclosing pressure relief valve device that utilizes a fusible or eutectic alloy mechanism, i.e. a material that yields or melts within a predetermined temperature range, to open the valve when subjected to excessive heat.

For example, Ryan U.S. Pat No. 1,924,417 describes a valve with a fusible element securing a valve element. When the fusible element melts, the valve element is displaced from its seat by pressure to release, e.g., inflammable gas. Jennings et al. U.S. Pat. No. 4,553,589 and Baker U.S. Pat. No. 5,109,881 describe valves having a pair of fusible elements that melt at different temperatures for sequential positioning of a spring-biased valve element. Rowley U.S. Pat. No. 1,925,007 describes fusible units, including in the form of a sleeve (FIG. 3). Naab et al. U.S. Pat. No. 4,164,953 describes a flood valve with a heating element for melting a thin walled section to release the valve.

SUMMARY OF THE INVENTION

According to the invention, a thermal relief valve for a gas cylinder comprises: a body having an inner wall defining an axial bore with an inlet and an outlet, the axial bore providing a passageway for flow of fluid between the inlet and the outlet, a piston disposed within the axial bore for movement between a first position, blocking flow of fluid from the inlet towards the outlet, and a second position, permitting flow of fluid from the inlet towards the outlet, in response to pressure differential between the inlet and the outlet, flow is blocked, with the piston in transition between first and second positions, the piston being installed in the first position, to block flow of fluid from the inlet towards the outlet, and the piston being urged towards the second position, to permit flow of fluid from the inlet towards the outlet, by a pressure differential, wherein pressure at the inlet exceeds pressure at the outlet by at least a predetermined amount, a restricting assembly positioned to arrest movement of the piston from the first position towards the second position, the restricting assembly comprising: a thermal sensitive element comprising a sleeve segment of eutectic material disposed in at least close proximity to the inner wall of the axial bore, a protrusion extending from the piston and defining a first camming surface, and two or more restricting elements defining a second camming surface positioned, in a first position of the restricting elements, for engagement with the first camming surface, the thermal sensitive element, at a temperature condition below a predetermined temperature, disposed relative to the restricting elements in a position to maintain the second camming surface disposed for engagement with the first camming surface, thereby to arrest movement of the piston from the first position towards the second position, and the thermal sensitive element, at a temperature condition at and above the predetermined first temperature, adapted to permit movement of the restricting elements from the first position of the restricting elements towards a second position of the restricting elements, with the second camming surface spaced from engagement with the first camming surface, thereby to permit movement of the piston towards the second position for release of fluid.

Preferred embodiments of the invention may include one or more of the following additional features. The engagement of the first camming surface with the second camming surface urges the restricting elements from the first position towards the second position. The thermal sensitive element has the form of a sleeve disposed in close proximity about the inner wall of the axial bore, and the two or more restricting elements comprises a set of arcuate segments arranged to define a second sleeve disposed about, and in engagement with, an inner surface of the first sleeve. The set of arcuate segments comprises a set of two or more segments, each defining an arc of at least about 90°.

These and other features and advantages of the invention will be apparent from the following description of a presently preferred embodiment, and from the claims.

DESCRIPTION OF THE PREFERRED EMBODIMENTS

An improved thermal relief valve for use on gas cylinders is designed to meet requirements for a non-reclosing pressure relief valve device for natural gas cylinders utilizing a fusible alloy mechanism. When the natural gas cylinder is subjected to excessive heat, the valve must be capable of emptying (relieving) the contents before the cylinder ruptures.

Figure 1:
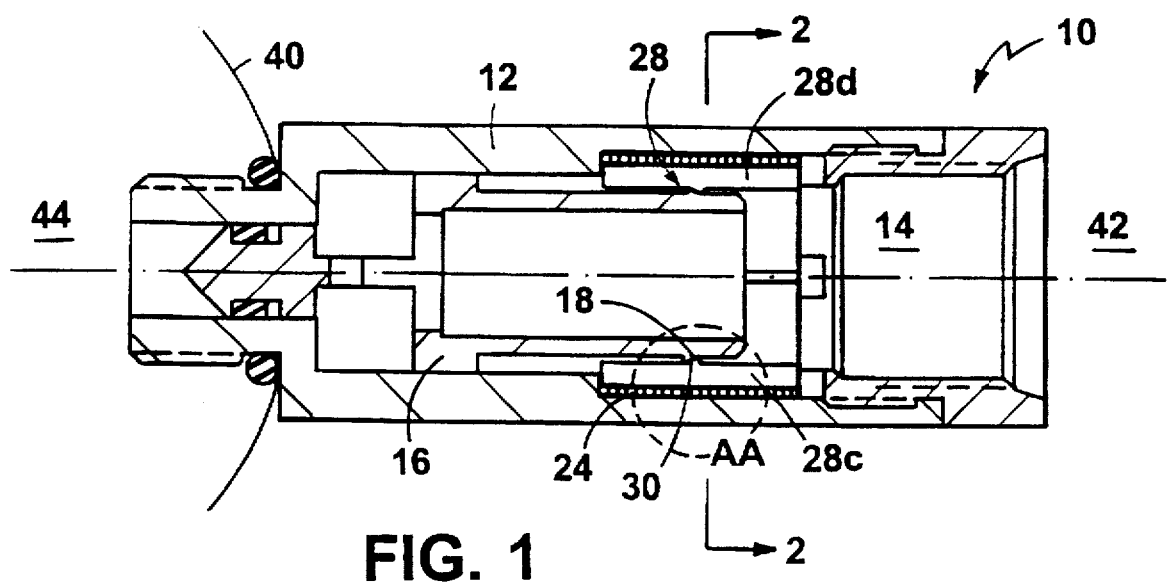
FIG. 1 is a side section view of a gas cylinder thermal relief valve of the invention, with the piston in a position arresting flow toward the outlet.

Referring to FIG. 1, a relief valve 10 of the invention includes a body 12 defining an axially bore 14 in which a piston 16 is disposed for axial movement.

Figure 1A:
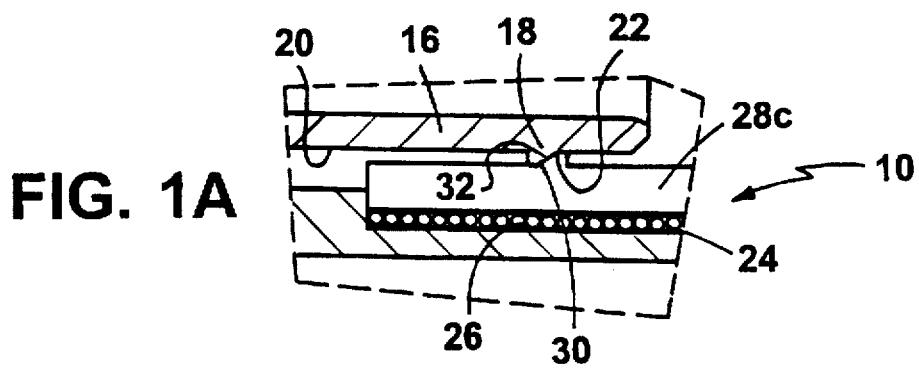
FIG. 1A is an enlarged side section view of the region A—A of FIG. 1.

Referring also to FIG. 1A, the piston 16 defines a circumferential inner shoulder 18 extending about its outer surface 20, the shoulder having a first camming surface 22.

Figure 2:
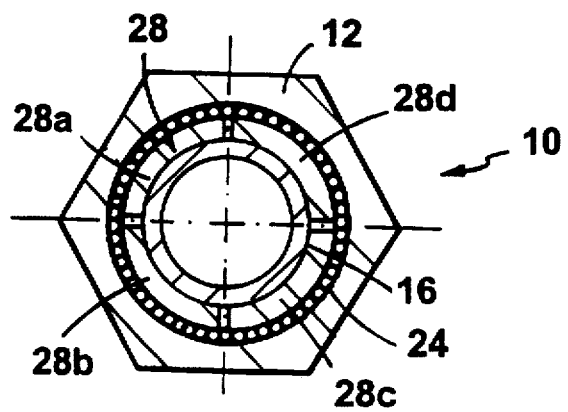
FIG. 2 is an end section view taken along the line 2—2 of FIG. 1.

Referring also to FIG. 2, an axial sleeve 24 of a suitable eutectic material, e.g. as known in the industry, is mounted within the bore 14, preferably in temperature-conducting contact with the inner wall surface 26 of the bore. A shoulder ring 28, consisting of a set of, e.g. four, arcuate segments 28a–28d and mounted within the ring sleeve 24, defines a circumferential outer shoulder 30 also having a second camming surface 32 disposed for interference engagement with the opposed, first camming surface 22 of the inner shoulder ring of the piston.

In use under normal conditions, with the tank 40 (FIG. 1) filled, e.g., with flammable gas at a first pressure differential, wherein pressure at the inlet 44 exceeds pressure at the outlet 42 by at least a predetermined amount, the piston 16 is restricted in a first position to arrest flow of fluid from the inlet 44 towards the outlet 42.

Figure 3:
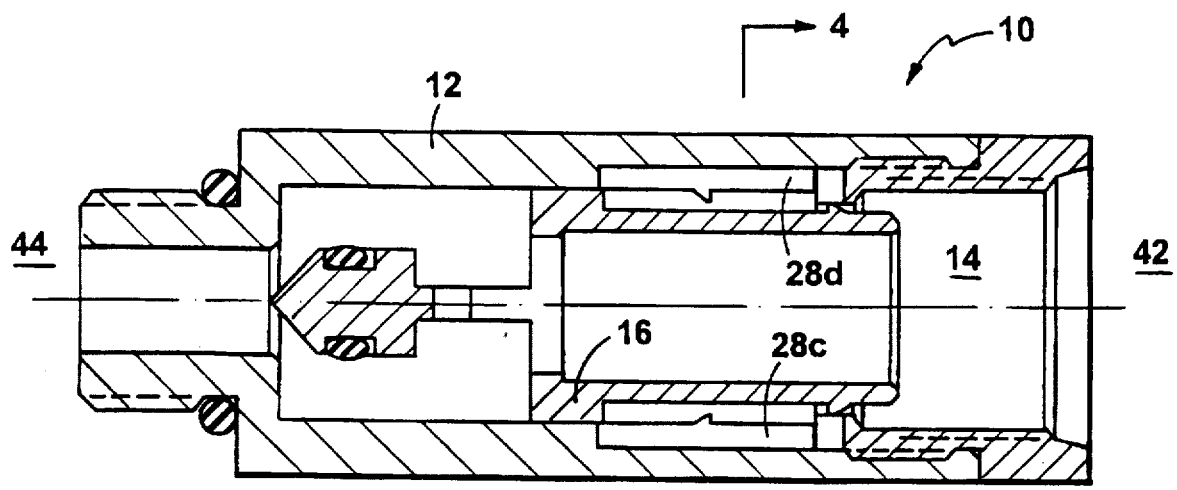
FIG. 3 is a side section view of a gas cylinder thermal relief valve of the invention, with the piston in a position permitting flow toward the outlet.
Figure 4:
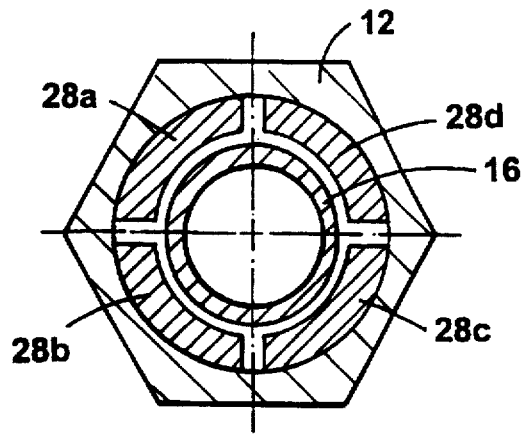
FIG. 4 is an end section view taken along the line 4—4 of FIG. 3.

Movement of the piston 16 towards the second position, i.e., as shown in FIG. 3, is arrested in the first position, i.e., as shown in FIG. 1, by engagement of the opposed camming surfaces 22, 32, thereby arresting the opening movement of the piston 16 and keeping the flow path closed.

Under conditions of high temperature, e.g. in the case of a fire, the eutectic material of the sleeve 24 melts, allowing the segments 28a–28d to move radially outward, urged by camming action of surface 22 of the piston 16 upon surface 32 of the restricting elements 28a–28d, thus allowing the piston 16 to move to the second position and opening the flow path for relief of the tank contents.

This arrangement offers advantages over prior art valves employing balls as the trigger mechanism, where the small contact area of each ball concentrates high stress on regions of the eutectic material, causing unwarranted pressure release. The use of camming surfaces also prevents partial opening on the valve caused by eutectic alloy freezing.

Other embodiments are within the following claims.

What is claimed is:

1. A thermal relief valve for a gas cylinder comprising:

a body having an inner wall defining an axial bore with an inlet and an outlet, said axial bore providing a passageway for flow of fluid between said inlet and said outlet, a piston disposed within said axial bore for movement between a first position, arresting flow of fluid from said inlet towards said outlet, and a second position, permitting flow of fluid from said inlet towards said outlet, in response to pressure differential between said inlet and said outlet, said piston being assembled in said first position, to arrest flow of fluid from said inlet towards said outlet, and said piston being urged towards said second position, to permit flow of fluid from said inlet towards said outlet, by a pressure differential, wherein pressure at said inlet exceeds pressure at said outlet by at least predetermined amount, a restricting assembly positioned to releasably arrest movement of said piston from said first position towards said second position;

said restricting assembly comprising:

a thermal sensitive element comprising a sleeve segment of eutectic material disposed in at least close proximity to said inner wall of said axial bore, one or more protrusions extending from said piston and defining a first camming surface, and two or more restricting elements defining a second camming surface positioned, in a first position of said restricting elements, for engagement with said first camming surface, said thermal sensitive element, at a temperature condition below a predetermined first temperature, disposed relative to said restricting elements in a position to maintain said second camming surface disposed for engagement with said first camming surface, thereby to arrest movement of said piston from said first position towards said second position, and said thermal sensitive element, at a temperature condition at and above said predetermined first temperature, adapted to permit movement of said restricting elements from said first position of said restricting elements towards a second position of said restricting elements, with said second camming surface spaced from engagement with said first camming surface, thereby to permit movement of said piston towards said second position for release of fluid.

2. The thermal relief valve for a gas cylinder of claim 1, wherein engagement of said first camming surface with said second camming surface urges said restricting elements from said first position towards said second position.

3. The thermal relief valve for a gas cylinder of claim 1, wherein said thermal sensitive element has the form of a first sleeve disposed is close proximity about the inner wall of said axial bore, and said two or more restricting elements comprises a set of arcuate segments arranged to define a second sleeve disposed about, and in engagement with, an inner surface of said first sleeve.

4. The thermal relief valve for a gas cylinder of claim 3, wherein said set of arcuate segments comprises a set of two or more segments, each defining an arc of at least about 90°.

* * * * *